(12) United States Patent
Trolliet et al.

(10) Patent No.: US 11,139,721 B2
(45) Date of Patent: Oct. 5, 2021

(54) MOTOR COMPONENT, PRIMARY PART AND LINEAR MOTOR

(71) Applicant: KESSLER ENERGY GMBH, Bad Buchau (DE)

(72) Inventors: Patrick Trolliet, Altshausen (DE); Markus Sinner, Eriskirch (DE); Christoph Zeumer, Ravensburg (DE); Daniel Borst, Andelfingen (DE); Markus Menz, Schemmerhofen (DE)

(73) Assignee: Kessler Energy GmbH, Bad Buchau (DE)

( * ) Notice: Subject to any disclaimer, the term of this patent is extended or adjusted under 35 U.S.C. 154(b) by 90 days.

(21) Appl. No.: 16/393,034

(22) Filed: Apr. 24, 2019

(65) Prior Publication Data

US 2019/0312489 A1 Oct. 10, 2019

Related U.S. Application Data

(63) Continuation of application No. PCT/EP2017/074705, filed on Sep. 28, 2017.

(30) Foreign Application Priority Data

Nov. 23, 2016 (DE) ...................... 10 2016 122 612.2

(51) Int. Cl.
*H02K 9/197* (2006.01)
*H02K 9/18* (2006.01)
(Continued)

(52) U.S. Cl.
CPC ............... *H02K 9/197* (2013.01); *H02K 9/18* (2013.01); *H02K 15/028* (2013.01); *H02K 41/03* (2013.01); *H02K 9/19* (2013.01); *H02K 9/22* (2013.01)

(58) Field of Classification Search
CPC .......... H02K 9/197; H02K 9/18; H02K 41/03; H02K 15/028
(Continued)

(56) References Cited

U.S. PATENT DOCUMENTS 3,846,824 A * 11/1974 Bell ........................ H01L 23/36
                                                              257/717
5,006,765 A *  4/1991 Schmider ................. H02K 3/47
                                                              29/598

(Continued)

FOREIGN PATENT DOCUMENTS

DE    10 2007 020 057 A1   11/2008
DE    11 2009 000 359 T5    1/2011
(Continued)

OTHER PUBLICATIONS

International Search Report and Written Opinion (Application No. PCT/EP2017/074705) dated Dec. 5, 2017.
(Continued)

*Primary Examiner* — Terrance L Kenerly
(74) *Attorney, Agent, or Firm* — Burr & Brown, PLLC

(57) ABSTRACT

A motor component for a linear motor, in particular a primary part and/or stator, which comprises a laminated core and a cooling body, wherein at least two grooves are arranged in the laminated core in order for at least two windings and/or at least two permanent magnets to be mounted in the grooves, wherein the grooves are arranged in parallel in one plane in the laminated core. In order to be able to produce good cooling and nevertheless provide a cost-effective motor component, the cooling body is connected to the laminated core and arranged parallel to the arrangement of the grooves, wherein the laminated core and the cooling body are adhesively bonded to one another.

18 Claims, 3 Drawing Sheets

(51) Int. Cl.
*H02K 15/02* (2006.01)
*H02K 41/03* (2006.01)
*H02K 9/22* (2006.01)
*H02K 9/19* (2006.01)

(58) Field of Classification Search
USPC .......................................................... 310/54
See application file for complete search history.

(56) References Cited

U.S. PATENT DOCUMENTS

| | | | |
|---|---|---|---|
| 6,278,203 B1 | 8/2001 | Novak et al. | |
| 6,339,269 B1* | 1/2002 | Hsiao | F28D 15/04 |
| | | | 310/60 A |
| 8,593,019 B2* | 11/2013 | Chung | H02K 21/26 |
| | | | 310/49.46 |
| 2008/0164773 A1* | 7/2008 | Wang | H02K 1/20 |
| | | | 310/54 |
| 2012/0170016 A1 | 7/2012 | Zordan | |

FOREIGN PATENT DOCUMENTS

| | | | | |
|---|---|---|---|---|
| DE | 112009000359 | * | 1/2011 | ............. H02K 41/03 |
| WO | 2008/071147 A2 | | 6/2008 | |

OTHER PUBLICATIONS

English translation of International Preliminary Report on Patentability (Chapter I) (Application No. PCT/EP2017/074705) dated Jun. 6, 2019, 9 pages.

European Office Action, European Application No. 17 777 252.2, dated Sep. 22, 2020 (4 pages).

\* cited by examiner

MOTOR COMPONENT, PRIMARY PART AND LINEAR MOTOR

CROSS REFERENCE TO RELATED APPLICATIONS

This application is a continuation of International Application No. PCT/EP2017/074705 filed Sep. 28, 2017, which designated the United States, and claims the benefit under 35 USC § 119(a)-(d) of German Application No. 10 2016 122 612.2 filed Nov. 23, 2016, the entireties of which are incorporated herein by reference.

FIELD OF THE INVENTION

The present invention relates to a motor component for a linear motor, in particular, a primary part or a stator, a primary part, and a linear motor.

BACKGROUND OF THE INVENTION

Various cooling systems for linear motors are proposed in the prior art. A linear motor with integrated cooling is known from DE 10 2007 020 057 A1, for example, wherein the cooling is obtained by virtue of cooling ducts which have been incorporated into the laminated core provided with grooves for the windings—that is to say, the corresponding individual sheets of the laminated core here have been designed in such a way that in the assembled state they form the corresponding cooling ducts.

SUMMARY OF THE INVENTION

It is an object of the present invention to be able to propose a motor component for a linear motor that can provide a reliable cooling and nevertheless can be produced inexpensively.

Accordingly, the motor component according to the present invention for a linear motor firstly includes a laminated core and a heat sink. A motor component of such a type may be, in particular, a primary valley or a stator. This primary part further includes windings and/or permanent magnets for forming a magnetic field with which ultimately a movable part of the linear motor is propelled which is present in the form of a secondary part, for instance.

A laminated core consists, as a rule, of combined individual sheets which have been mutually electrically insulated, in order to avoid eddy currents that might be inductively generated therein if a corresponding body that is intended to conduct the field lines and to intensify the magnetic field were to have been formed from a ferromagnetic solid material. The coils or windings and/or corresponding permanent magnets have been arranged in grooves in the laminated core.

The present invention is distinguished in that the heat sink has been connected to the laminated core and arranged parallel to the arrangement of the grooves, the laminated core and the heat sink having been adhesively bonded to one another. By virtue of the arrangement in a plane parallel to the grooves, it is made possible that the heat sink may have been arranged close to the respective windings, where appropriate also with constant or substantially invariable spacing from the windings, so that a homogeneous cooling is made possible. In addition, a particularly cost-effective manufacture can be achieved, because the two parts—the laminated core and the heat sink—can be manufactured as separate parts, so that corresponding cooling ducts do not have to be manufactured in the material consisting of individual sheets, this being comparatively costly. On the other hand, by reason of this proposed style of construction, the materials can be connected to one another in a straightforward manner but nevertheless without air gaps or other factors impeding the conduction of heat.

This connection between the laminated core and the heat sink is surprisingly made possible by adhesive bonding, the adhesive bonding being undertaken, in particular, with a very thin adhesive layer. On the one hand, the spacing between the laminated core and the heat sink may, as a result, turn out to be very small, favoring a good dissipation of heat; on the other hand, as a result it is made possible that a very stable connection is obtained between the laminated core and the heat sink. In surprising manner, this can also withstand very large forces which generally act on an active part of a motor in operation. Moreover, air gaps between heat sink laminated core can be avoided in the case of the proposed structure. Although, in principle, some adhesives may definitely also exhibit poor heat-conducting properties, in the present case it proves to be advantageous that the adhesive layer itself can be formed only very thinly and therefore the thermal resistance caused by it turns out to be rather low.

In order to obtain a contact area that is as large as possible between the laminated core and the heat sink, at least one of the two, or both, may take the form of a plate, so that heat-sink ducts, and windings arranged in the grooves of the laminated core as heat-source, can extend in parallel planes. Furthermore, a small spacing of the ducts and the windings from one another is also made possible, so that, overall, a good and uniform dissipation of heat is made possible.

To this extent, in a preferred further development of the present invention the laminated core and the heat sink may have been connected to one another in a sandwich style of construction. Aside from the short distances between heat-generating windings and heat-dissipating cooling ducts, it is made possible that, in addition, the mechanical rigidity is increased, since the corresponding "sandwich layers" stabilize one another and ensure a higher moment of flexion or areal moment of inertia. In accordance with the present invention and also according to the embodiment under discussion with a structure in a sandwich style of construction, further advantages are offered over a conventional structure according to the prior art, which often provides a solid encapsulation of the primary part; for, according to the prior art, it has proved disadvantageous that pockets of air are often to be found in the potting material.

In particular in one practical variant of the present invention, the laminated core may take the form of a baked-lacquer laminated core, in order to increase the mechanical rigidity. In addition to this, at least one baked-lacquer winding which has been potted may have been arranged in the grooves, so that the mechanical rigidity can also be increased by this means. In addition, in this practical form it is conceivable that, instead of wire coated with baked lacquer, use is also made of conventionally insulated winding wire. In a preferred embodiment, orthocyclically wound baked-lacquer coils have been provided as windings. In other respects, although use is often made of round wire, which accordingly has a round cross-section, in principle a square wire, for example, may also be employed. The cross-section may play a role, in particular, if it is a question of obtaining a winding package that is as tight as possible. By virtue of windings that have been as tightly packed as possible, fields can be generated that are as intense as possible, with as little space requirement as possible, by virtue of which the power of the motor can be increased.

As already mentioned above, in advantageous manner the heat sink may exhibit at least one duct for conducting cooling liquid. By way of cooling liquid, use may be made of water, for instance. A cooling duct of such a type the embodiment of the present invention can be arranged in advantageous manner in such a way that it penetrates, as uniformly and tightly as possible, the surface of the heat sink, which is parallel to the plane in which the grooves have been arranged, so that a dissipation of heat that is as homogeneous and uniform as possible can be obtained. For instance, such a cooling duct in a plate may have a meandering course. It is also conceivable that several cooling ducts pass through the plate.

In particular when the corresponding heat sink is not penetrated by cooling ducts on a straight path, it is advantageous to mill corresponding cooling ducts into the plate for example—in particular, parallel to the plane in which the grooves have been arranged. In order to terminate the cooling ducts tightly in turn, no such case a cover been provided, which is fastened on the side of the plate or of the heat sink on which the open sections of the cooling ducts are located. The cover can be manufactured inexpensively as an individual part.

In order to connect the laminated core and the heat sink to one another, use is preferentially made of a temperature-resistant adhesive, since, in part, during the operation of the motor relatively high temperatures may be attained and precisely then it is necessary that a good mechanical cohesion between the heat sink and the laminated core is present nevertheless. For this reason, various temperature-resistant adhesives, for example, may be employed, in particular a two-component adhesive based on epoxy resin. In order to produce a stable layer, which thermally means a low resistance, in particular an adhesive layer having a thickness of at most 0.25 mm may have been provided.

For the purpose of good dissipation of heat and, at the same time, in order to obtain a comparably low weight of the motor component, the heat sink may have been manufactured from aluminum, for example. In addition, this material is comparatively inexpensive.

In connection with a practical form in which the cooling ducts into the heat sink have been restricted, it has already been explained that this open region of the cooling ducts has to be covered up, which can be done, for example, with the aid of a cover. Above all when the heat sink itself has been manufactured from aluminum, in advantageous manner the cover may likewise have been manufactured from aluminum, this having the advantage, amongst other things, that, when heated, the cover and the heat sink consequently have the same or at least a very similar coefficient of thermal expansion and accordingly both also behave identically, given identical heating, and mechanical stresses do not occur. A cover represents a cost-effective variant in order to cover up and to seal the totality of the cooling ducts.

However, if the cooling ducts are flowed through by a liquid on which a high pressure is acting, in principle there is the possibility that the cover will bulge upward, in particular, if it is a question of a comparatively thin material, relative to the rest of the heat sink. As a rule, the cover may have been manufactured from a flat sheet, for example. In this case, in appropriate circumstances it is not sufficient to fasten the cover merely to the edges of the heat sink, as has also often been provided in the prior art in particular. In a particularly preferred further development of the present invention, the cover has been fastened to the plate of the heat sink by friction stir welding, in order to be able to increase the mechanical stability at high pressures of the cooling liquid flowing through the duct, and also, furthermore, to be able to increase the mechanical rigidity. Particularly preferred is a variant in which the cover has been fastened to the plate of the heat sink in such a manner that the at least one duct has been surrounded at least partially—in particular, completely—by the welding path. This means that, in the case of cooling-duct sections situated in parallel, as a rule a welding path is also situated at least partially between the sections.

In the course of friction stir welding, in the welding stud of the welding tool is rotated or set in rotation and, in the process, pressed into the material until the weld shoulder is resting on the material. While the welding stud continues to rotate, the welding tool is guided along the welding path to be welded, in the course of which the material is put into a doughy state—that is to say, it becomes plastic—and is machinable. A fine-grained connection region arises between the two workpieces that are to be connected to one another. In advantageous manner, only a small input of heat takes place, so that the workpiece is treated with care, whereas, however, outstanding and very stable connection properties can be achieved.

Accordingly, a primary part according to the present invention and a linear motor according to the present invention are distinguished in that use is made of a corresponding motor component according to the present invention and, in the case of a linear motor, a corresponding primary part according to the present invention or according to one of the embodiments, so that the aforementioned advantages can be obtained.

BRIEF DESCRIPTION OF THE DRAWINGS

An embodiment of the present invention is represented in the drawings and will be elucidated in more detail below, with specification of further particulars and advantages.

DETAILED DESCRIPTION OF THE INVENTION

Figure 1:
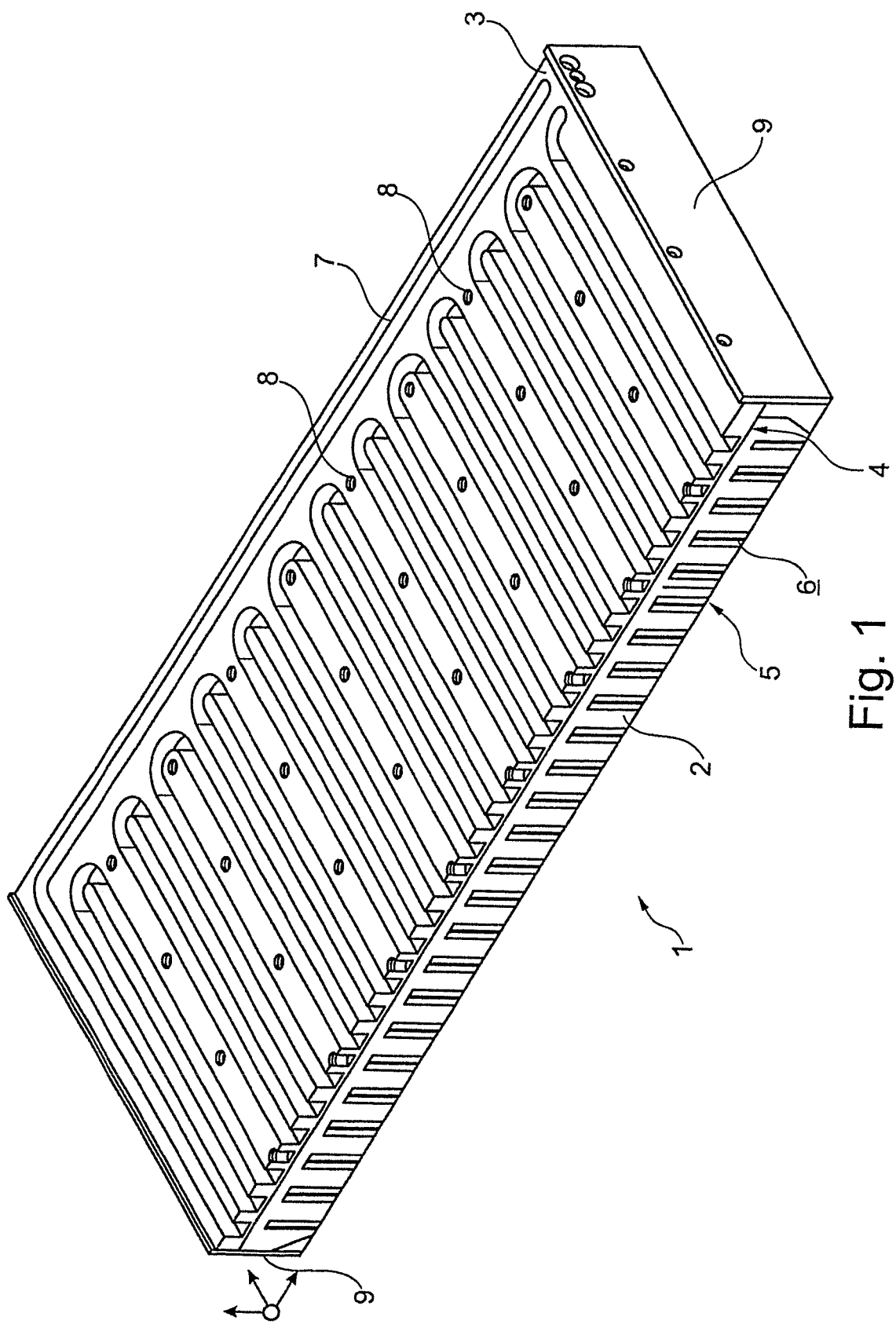
FIG. 1 is a schematic section through a primary part of a linear motor according to the present invention (without cover)

FIG. 1 shows a schematic sectional representation through a primary part 1 of a linear motor with a laminated core 2 and with a heat sink 3. The laminated core 2 and the heat sink 3 both take the form of plates which have been adhesively bonded onto one another in a sandwich style of construction. The adhesive layer is denoted by reference symbol 4. Located in the laminated core 2 are grooves 5 which, in turn, have been provided with windings 6. In the heat sink 3, in turn, a cooling duct 7 has been milled which has a substantially meandering course and penetrates practically the entire surface of the heat sink 3. For the purpose of fastening the primary part 1, bores 8 have been provided in the heat sink. On the end faces of the primary part 1 there are respectively located terminating sheets 9 which each constitute a part of the housing of the motor. Leads for supplying energy to the windings 6 can also be fed through these sheets 9.

The windings 6 may have been provided as orthocyclically wound baked-lacquer coils, for instance, using a round wire. This measure makes a high packing density possible. The laminated core 2 may also take the form of a baked-lacquer package. The use of baked lacquer for the laminated core 2 and for the windings 6 makes it possible to obtain a high mechanical rigidity.

In advantageous manner, the laminated core 2 and the heat sink 3 have been combined so as to form one part, and the adhesive layer 4, by which the two have been connected to one another, has been formed very thinly. By virtue of the large-area application of the adhesive and the adhesive surface which has consequently also been chosen to be very large, a high degree of stability of this connection between the laminated core 2 and the heat sink 3 is obtained. In addition, the sandwich style of construction itself makes possible, in turn, a high degree of mechanical stiffening. Even when the corresponding motor components are exposed to large forces, a particularly stable style of construction nevertheless obtains. In addition, a very compact style of construction obtains which, on the one hand, utilizes the available space as well as possible and therefore can be integrated very well as a whole into a range of machines. In the present case, the compact style of construction has, as a rule, a positive effect on the mechanical rigidity and stability.

As is likewise evident from FIG. 1, the plane in which the grooves 5 have been arranged is situated parallel to the plane in which the cooling ducts 7 are located. The present sandwich style of construction makes it possible that cooling ducts 7 and grooves 5 are situated at a comparatively small spacing from one another. The entire region above the surface in which the grooves 5 have been arranged is substantially uniformly penetrated by cooling ducts 7. By reason of this, a particularly good dissipation of heat, also through the adhesive layer 4 which in any case has been formed only very thinly, can also be obtained. The cooling surface is maximized to a certain extent. By virtue of the formation of the heat sink 3 from aluminum, a high degree of thermal conductivity is again achieved. The spacing from the windings 6, which constitute the heat-source, is kept as small as possible. The particularly good cooling also ensures that no excessive transfer of heat takes place to further components of the machine in which the motor component or the corresponding linear motor is being employed.

The advantages achieved—namely that, on the one hand, in the present embodiment of the invention a high packing density obtains but, on the other hand, a good dissipation of heat and cooling can also be obtained—have the result that the sustained power of the motor can be distinctly increased in comparison with conventional linear motors from the prior art.

The simple gluing-together of the heat sink 3 and the laminated core 2 makes possible, in turn, a simple assembly and a cost-effective manufacture. In other respects, the linear motor does not have to be manufactured by hand, but an at least partially automated manufacture is likewise possible.

Figure 2:
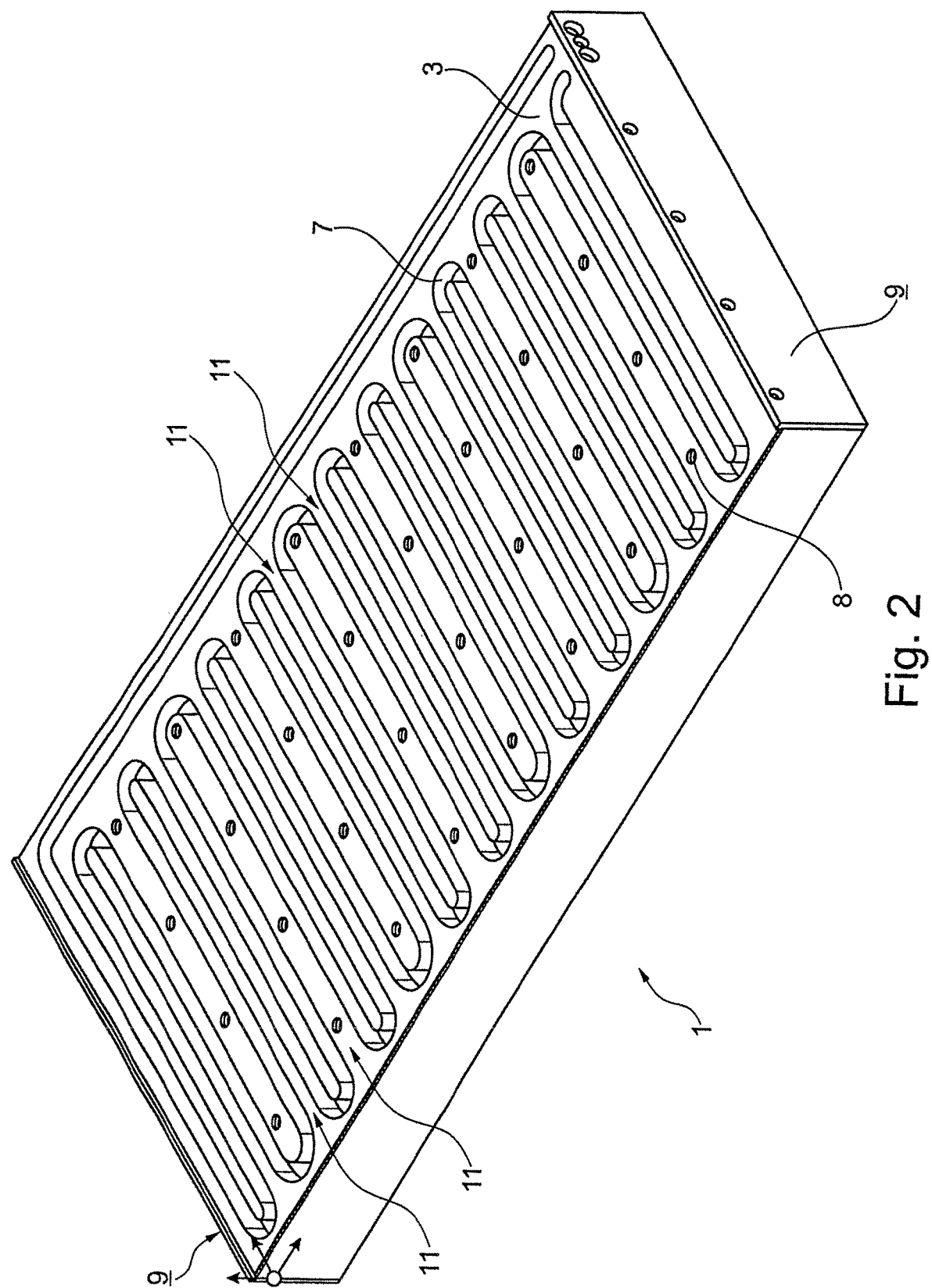
FIG. 2 is a schematic representation of the primary part from FIG. 1 (without cover)

The representation according to FIG. 2 shows the same view as FIG. 1 once again, but not as a sectional representation. Here, the entire course of the cooling ducts 7, in particular, the course thereof meandering over the surface of the heat sink 3, is visible.

Figure 3:
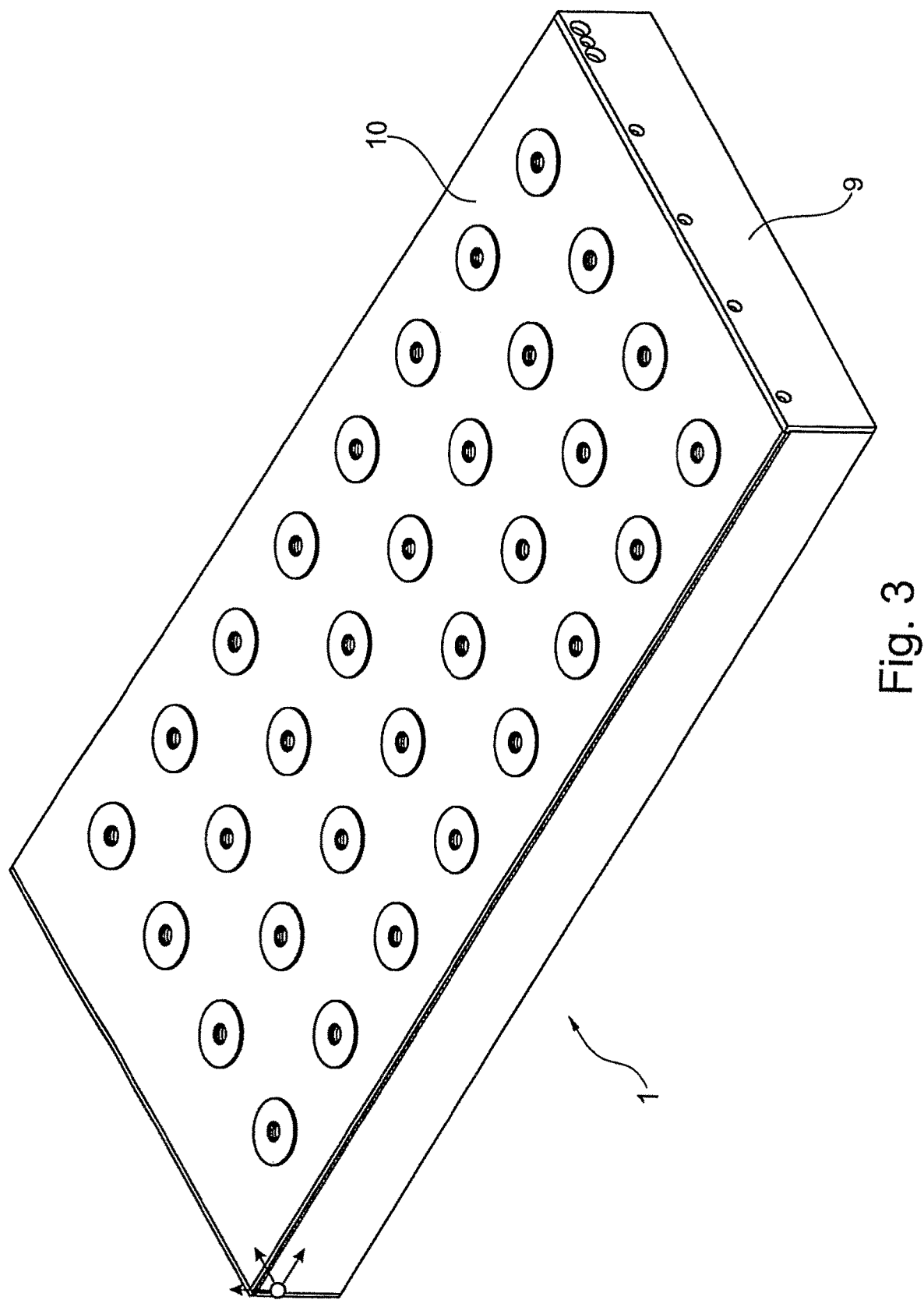
FIG. 3 is a schematic representation of the primary part from FIGS. 1, 2, with cover.

Also in FIG. 3 the same view is to be seen once more, but here the cover 10 has been applied onto the heat sink 3. The cover 10, in turn, conceals the cooling ducts 7 and seals them in the upward direction in the drawing. In order to obtain a course of the cooling ducts 7 that is as compact as possible, the cover 10 has been applied and fastened onto the heat sink 3 by friction stir welding. The welding path may, in particular, have been arranged between the meandering loops of the cooling ducts 7. These regions have been labeled in exemplary manner in FIG. 2 by reference symbol 11. The process of friction stir welding makes possible a very firm and stable materially-closed connection between the cover 10 and the heat sink 3, so that the cooling ducts 7 may also be under high pressures by virtue of the cooling liquid (roughly in the order of 6 bar). In this way, a high flexural rigidity is also achieved.

A feature that is common to all the embodiments of the present invention is that the heat sink has been connected to the laminated core and arranged parallel to the arrangement of the grooves, the laminated core and the heat sink having been adhesively bonded to one another. By virtue of this technical measure, in surprising manner a particularly stable structure with good dissipation of heat is made possible, because generally it would more likely be expected that—given the large attractive forces that act on an active part of a linear motor and that are in the order of 20 kN to 30 kN—an adhesive bond would be too unstable, whereas—as it turns out in connection with the present invention—the converse is the case. But the particularly simple assembly also makes possible, in particular, a reduction of the assembly-time, which likewise has an advantageous effect on the costs of assembly. In addition, the present invention also makes possible, in surprising manner, a high degree of economy and cost-saving in the course of manufacture, since, in contrast to the prior art, the laminated core, the heat sink, etc. can be manufactured comparatively favorably as individual components. In one embodiment of the present invention, in which the cover is connected to the heat sink by friction stir welding, this cost-saving may also definitely compensate for the higher costs still possibly resulting at the present time (by virtue of the friction stir welding).

LIST OF REFERENCE SYMBOLS

1 primary part
2 laminated core
3 heat sink
4 adhesive layer
5 grooves
6 windings
7 cooling duct
8 threaded bores
9 terminating sheets
10 cover
11 intermediate region for welding path

The invention claimed is:

1. A motor component for a linear motor comprising a laminated core and a planar plate defining a planar heat sink, the heat sink having an upper surface with opposing first and second edges and a cooling duct defined in the upper surface, wherein at least two grooves are arranged in the laminated core in order to attach at least two windings and/or at least two permanent magnets, wherein the grooves extend parallel to a plane in the laminated core, wherein the heat sink is connected to the laminated core and arranged parallel to the arrangement of the grooves, wherein the laminated core and the heat sink are adhesively bonded to one another, wherein the cooling duct includes a first plurality of spaced apart adjacent first duct portions, each of the adjacent spaced apart first duct portions having a first end proximate the first edge of the heat sink, and a second end proximate the second edge of the heat sink, a second plurality of spaced apart adjacent second duct portions, each of the plurality of second duct portions being defined between two of the adjacent first duct portions and having a first end proximate the second edge of the heat sink and a second end proximate the first edge of the heat sink, a third plurality of third duct portions, each third duct portion connecting a second end of one of the first duct portions to a first end of an adjacent second duct portions, a fourth plurality of fourth duct portions, each fourth duct portion connecting a first end of one of the first duct portions to a second end of an adjacent one of the second duct portions, and a cooling liquid flowing through the first, second, third, and fourth duct portions in contact with the duct portions and, wherein at least a portion of the cooling duct penetrates the heat sink.

2. The motor component as claimed in claim 1, wherein the laminated core takes the form of a plate.

3. The motor component as claimed in claim 2, wherein the plate of the heat sink is manufactured from aluminum.

4. The motor component as claimed in claim 1, wherein the laminated core and the heat sink are connected to one another in a sandwich style of construction in order to increase mechanical rigidity.

5. The motor component as claimed in claim 1, wherein the laminated core takes the form of a baked-lacquer laminated core in order to increase mechanical rigidity.

6. The motor component as claimed in claim 1, wherein at least one baked-lacquer winding is arranged in the grooves, said winding having been potted in order to increase mechanical rigidity.

7. The motor component as claimed in claim 6, wherein the baked-lacquer winding takes the form of an orthocyclically wound baked-lacquer coil with round wire.

8. The motor component as claimed in claim 1, wherein the at least one duct is milled into the plate parallel to the planar heat sink in which the grooves are arranged.

9. The motor component as claimed in claim 1, wherein the laminated core and the heat sink are adhesively bonded to one another by a temperature-resistant adhesive.

10. The motor component as claimed in claim 9, wherein the adhesive is a 2-component adhesive based on epoxy resin.

11. The motor component as claimed in claim 9, wherein said adhesive forms a layer having a thickness of at most 0.25 mm.

12. The motor component as claimed in claim 1, wherein the heat sink is at least partially manufactured from aluminum.

13. The motor component as claimed in claim 1, further comprising a cover made of aluminum provided for covering up the at least one duct portion.

14. The motor component as claimed in claim 13, wherein the cover is fastened to the plate of the heat sink by friction stir welding in order to increase mechanical stability when the cooling liquid is flowing through, and/or mechanical rigidity.

15. The motor component as claimed in claim 14, wherein the cover is fastened to the plate of the heat sink in such a manner that the at least one duct is surrounded at least partially by a welding path resulting from the friction stir welding.

16. A primary part for a linear motor comprising a motor component as claimed in claim 1.

17. A linear motor with a motor component as claimed in claim 1.

18. A primary part as claimed in claim 16, wherein the motor component is a stator.

* * * * *